(12) United States Patent
Smith

(10) Patent No.: US 7,433,323 B2
(45) Date of Patent: Oct. 7, 2008

(54) REMOTE TESTING OF HIGH SPEED DATA AND VOICE COMMUNICATION NETWORKS

(75) Inventor: Roger A. Smith, Gibsonia, PA (US)

(73) Assignee: Tollgrade Communications, Inc., Wilmington, DE (US)

( * ) Notice: Subject to any disclaimer, the term of this patent is extended or adjusted under 35 U.S.C. 154(b) by 987 days.

(21) Appl. No.: 10/479,431

(22) PCT Filed: May 31, 2002

(86) PCT No.: PCT/US02/17008

§ 371 (c)(1),
(2), (4) Date: Apr. 30, 2004

(87) PCT Pub. No.: WO02/099567

PCT Pub. Date: Dec. 12, 2002

(65) Prior Publication Data

US 2005/0025189 A1 Feb. 3, 2005

(51) Int. Cl.
*H04L 1/00* (2006.01)
*H04L 12/26* (2006.01)

(52) U.S. Cl. .................. 370/253; 370/245; 370/247; 370/248; 370/395.52; 370/401; 379/14.01; 379/15.01; 379/29.01

(58) Field of Classification Search .............. 370/537, 370/242, 245, 247, 248, 252, 253, 395.1, 370/395.5, 395.52, 401; 379/14.01, 29.01, 379/15.01
See application file for complete search history.

(56) References Cited

U.S. PATENT DOCUMENTS

| 5,111,497 A | 5/1992 | Bliven et al. |
| 5,528,661 A * | 6/1996 | Siu et al. .................. 379/29.01 |
| 5,615,225 A | 3/1997 | Foster et al. |
| 5,793,751 A | 8/1998 | Baker et al. |
| 6,002,671 A * | 12/1999 | Kahkoska et al. ........... 370/248 |
| 6,209,108 B1 | 3/2001 | Pett et al. |
| 6,496,566 B1 * | 12/2002 | Posthuma .................... 379/22 |
| 6,584,148 B1 * | 6/2003 | Zitting et al. ............... 375/222 |
| 7,289,604 B2 * | 10/2007 | Bremer .................... 379/29.01 |

* cited by examiner

*Primary Examiner*—Ricky Ngo
*Assistant Examiner*—DeWanda Samuel
(74) *Attorney, Agent, or Firm*—The Webb Law FIrm

(57) ABSTRACT

Faults or degradation of performance of a voice/data communication network (2) are identified without the need to dispatch service personnel by selectively testing isolated sections of the communication network. For some of these tests, the communication network address of a customer's modem under test (106, 114, 60, 66) is retrieved from a database (88) for use in directing these tests to the customer's modem (106, 114, 60, 66) and for emulating the customer's modem (106, 114, 60, 66) during one or more of the tests.

16 Claims, 4 Drawing Sheets

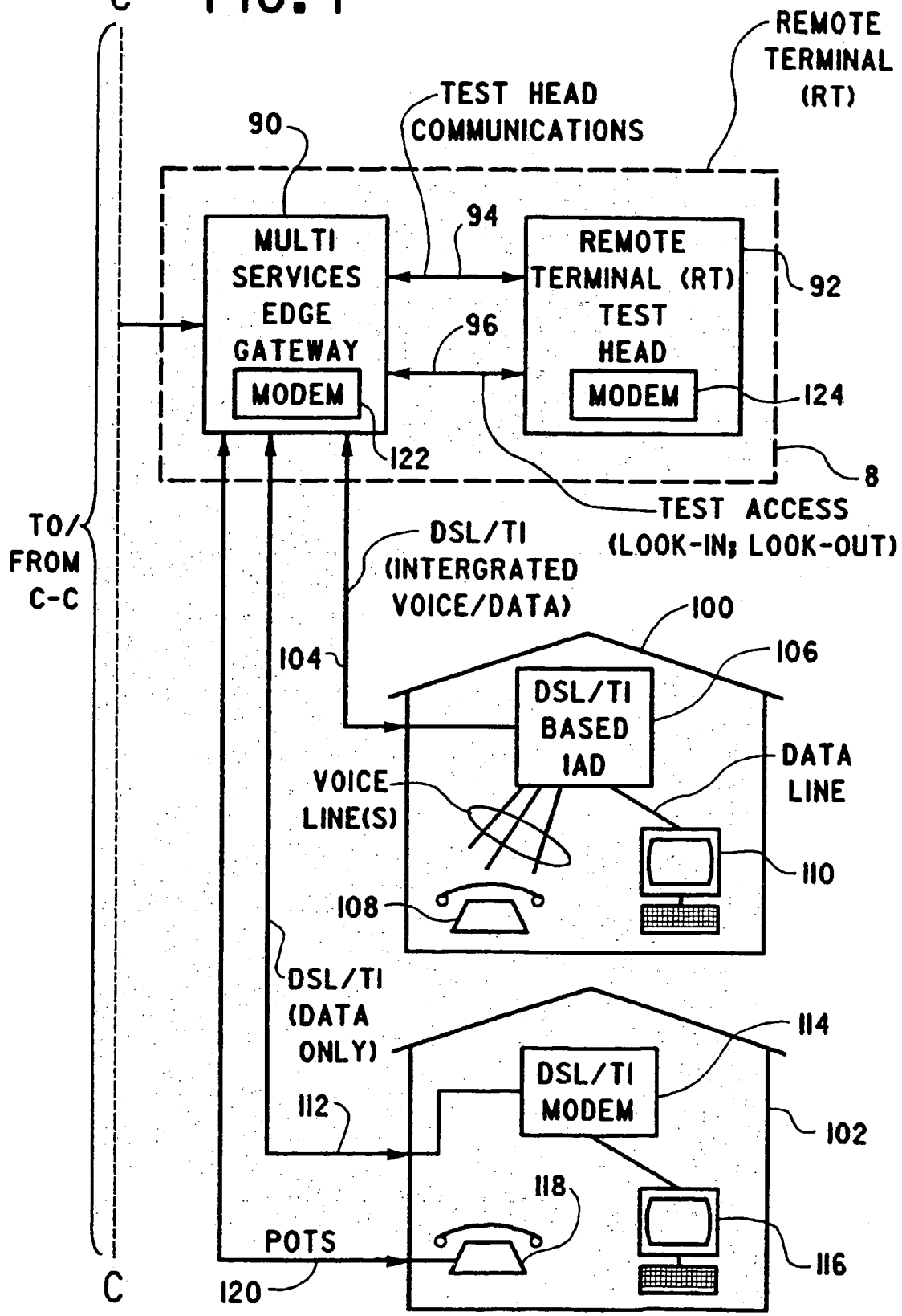

REMOTE TESTING OF HIGH SPEED DATA AND VOICE COMMUNICATION NETWORKS

BACKGROUND OF THE INVENTION

1. Field of the Invention

The present invention relates to isolating failures or causes of degraded performance on a voice/data communication network without the need for dispatching service personnel.

2. Description of Related Art

Heretofore, one of the problems encountered with deploying and maintaining a digital subscriber line (DSL) service to a customer was the inability to fully and remotely test the communication network that included the DSL service. To this end, the prior art solution for testing DSL services included dispatching service personnel and equipment to various points on the network to determine whether the DSL service was working properly. However, such dispatches are costly and time-consuming.

It is, therefore, an, object of the present invention to overcome the above problem and others by providing a method for remotely testing a communication network that provisions DSL service to a customer. Still other objects will become apparent to those of ordinary skill in the art upon reading and understanding the following detailed description.

SUMMARY OF THE INVENTION

Accordingly, I have invented a method of fault isolation on a communication network having a controller, a data network, a voice network and an integrated data/voice network communicatively coupled to a packet switch. The integrated data/voice network includes an edge gateway coupled to the packet switch, a test head coupled to the edge gateway, and a customer modem coupled to the edge gateway via a conductive line. The customer's modem resides at a network address of the integrated data/voice network. The method includes causing the controller to retrieve from a database the network address and modem parameters of the customer's modem. Next, synchronization is acquired between a modem of the edge gateway and the customer modem at the network address via the conductive line. If synchronization is not acquired, an indication of such is logged with the controller and the method is terminated. However, if synchronization is acquired, the efficacy of the conductive line between the edge gateway modem and the customer modem is tested by the test head. If the efficacy of the conductive lines is not within a predetermined tolerance, an indication of such is logged with the controller and the method is terminated. However, if the efficacy of the conductive line is within the predetermined tolerance, the customer's modem parameters are installed in the test head modem. Next, synchronization is acquired between a modem of the test head and the edge gateway modem at the same synchronization rate that the edge gateway modem synchronized with the customer modem., If synchronization is not acquired, an indication of such is logged with the controller and the method is terminated. However, if synchronization is acquired, a test of the data network or the voice network is initiated from the edge gateway under the control of the test head via the test head modem and the edge gateway modem. The result of the test is received at the test head via the test head modem and the edge gateway modem. If the result of the test is not within a predetermined tolerance therefor, an indication of such is logged with the controller and the method is terminated.

The test of the data network can include a Ping test or determining a data transmission rate of a file download from the data network to the edge gateway. The test of the voice network can include initiating a call to the voice network and, thereafter, initiating a first voice quality test of the voice network with the edge gateway modem operating at a first data rate. The test of the voice network can further include initiating a second voice quality test of the voice network with the edge gateway modem operating at a second, slower data rate concurrent with the download of a file to the edge gateway modem from the data network.

BRIEF DESCRIPTION OF THE DRAWING

The FIGURE is a block diagram of an exemplary voice and data communication network.

DETAILED DESCRIPTION OF THE INVENTION

Figure 1:
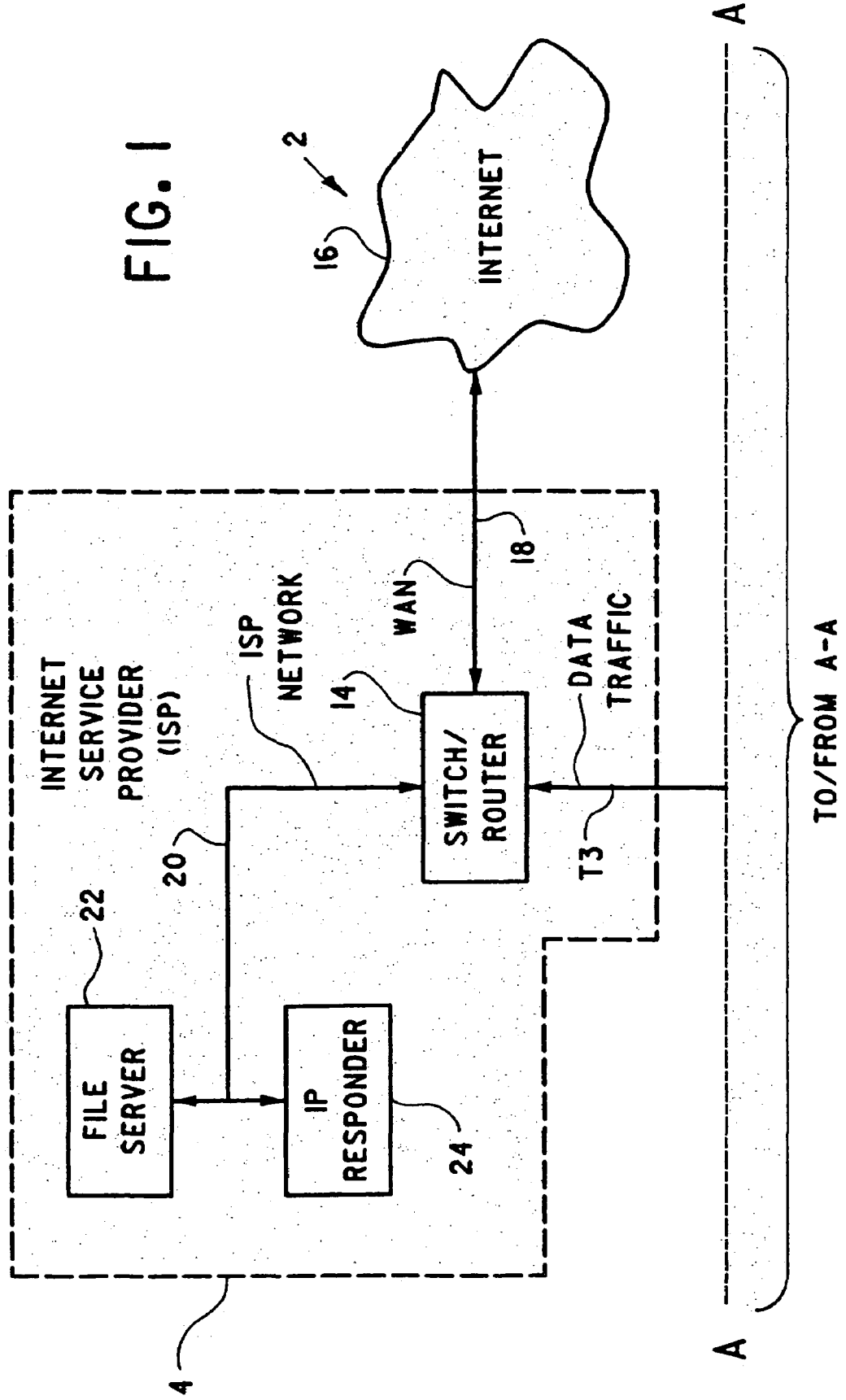
Figure 1:
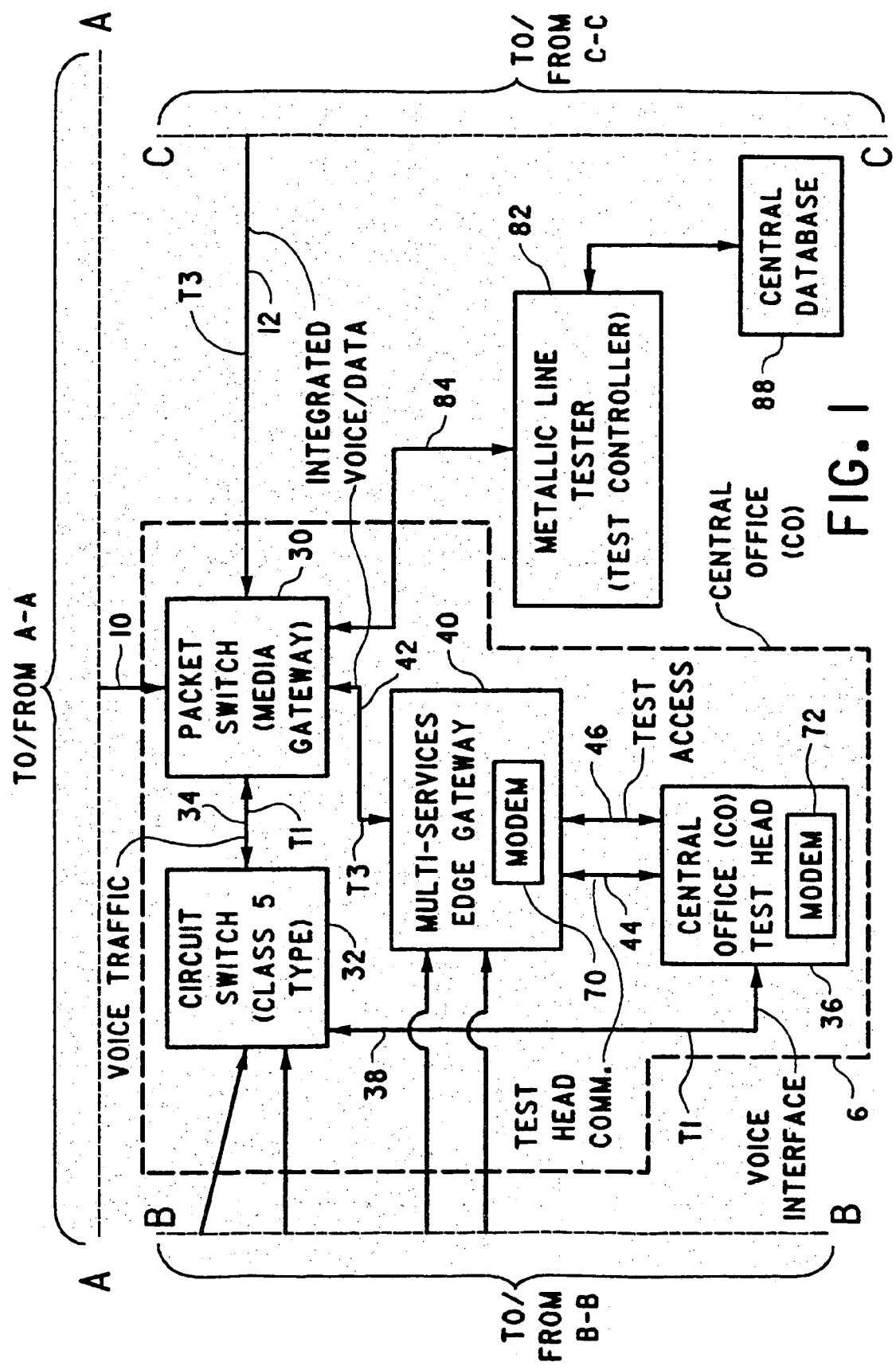
Figure 1:
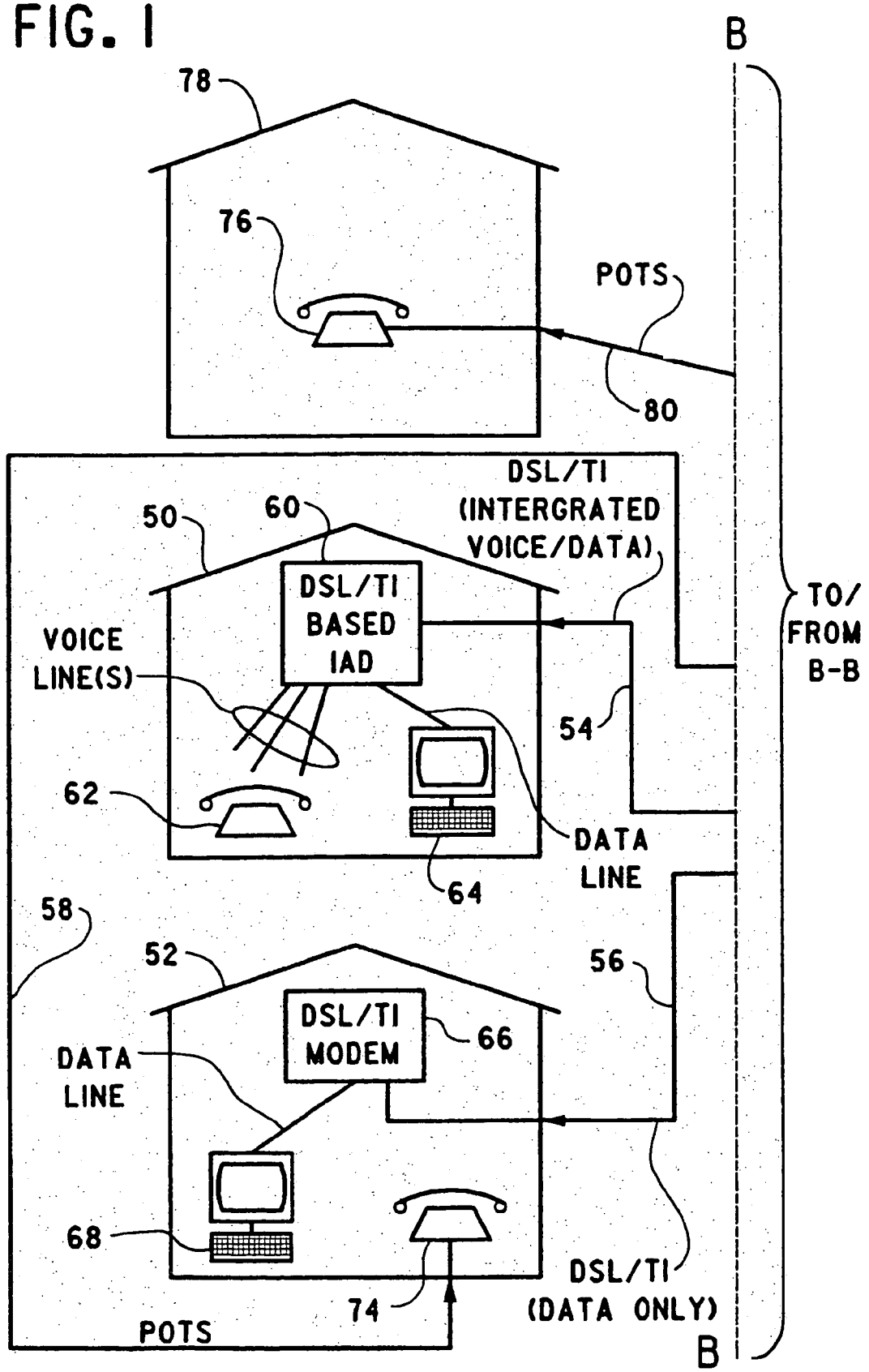

The FIGURE is a generalized schematic drawing of an exemplary voice and data communication network 2 that includes an Internet Service Provider (ISP) 4 coupled to a Central Office (CO) 6, and a Remote Terminal (RT) 8 coupled to CO 6. For simplicity of illustration, the FIGURE shows only one ISP 4 and only one RT 8 coupled to CO 6. However, CO 6 can be coupled to a plurality of ISP's 4 and a plurality of RT's 8.

CO 6 is coupled to ISP 4 and RT 8 by high speed communication lines 10 and 12, respectively. In the FIGURE, high speed communication lines 10 and 12 are each T3 lines. However, this is not to be construed as limiting the invention.

ISP 4 includes a switch/router 14 that selectively couples high speed communication line 10 to the Internet 16 via a wide area network (WAN) 18. Switch/router 14 also couples high speed communication line 10 to an ISP network 20 which communicatively couples switch/router 14 to a file server 22 and an IP responder 24. Switch/router 14, Internet 16, file server 22 and IP responder 24 collectively form a data network that can transmit or receive data packets to or from CO 6 via high speed communication line 10.

CO 6 includes a packet switch 30, also known as a media gateway, which is coupled to a circuit switch 32 via a high speed communication line 34. Circuit switch 32 converts voice packets received from packet switch 30 into analog voice signals which can be selectively coupled to customer voice equipment communicatively connected to circuit switch 32. Similarly, circuit switch 32 can receive analog voice signals from customers coupled to circuit switch 32 and can convert these analog voice signals into voice packets that circuit switch 32 provides to packet switch 30. In the illustrated embodiment, high speed communication line 34 is a T1 line. However, this is not to be construed as limiting the invention.

Circuit switch 32 is connected to a central office CO test head 36 via a voice interface 38. CO 6 also includes a multi-services edge gateway 40 which is coupled to packet switch 30 via a high speed communication line 42. In the illustrated embodiment, high speed communication line 42 is a T3 line. However, this is not to be construed as limiting the invention.

Edge gateway 40 is also coupled to central office test head 36 via a test head communication line 44 and a test access line 46. Test head communication line 44 facilitates command and control communication between edge gateway 40 and CO test head 36. Test access line 44 enables test circuitry of CO test head 36 to connect to internal circuitry of edge gateway 40 or to customer circuits that are coupled to edge gateway 40.

In the illustrated embodiment, customers 50 and 52 are coupled to edge gateway 40 via high speed communication lines 54 and 56, respectively. Line 54 is either a DSL line or a T1 line that is configured to carry integrated voice/data packets. Line 56 is either a DSL line or a T1 line that is configured to only carry data packets. The description of lines 54 and 56 as being a DSL line or a T1 line, however, is not to be construed as limiting the invention.

Line 54 terminates at the premises of customer 50 in an Integrated Access Device (IAD) 60. IAD 60 is configured to convert voice and data packets received on line 54 into voice and data signals which are provided to voice equipment 62 and data equipment 64, respectively, of customer 50. IAD 60 is also configured to convert voice and data signals received from voice equipment 62 and data equipment 64, respectively, into voice and data packets, which are provided to edge gateway 40 via line 54.

More specifically, voice packets received by IAD 60 via line 54 are converted into voice signals which IAD 60 provides to voice equipment 62. Similarly, voice signals received from voice equipment 62 are converted into voice packets which IAD 60 provides to edge gateway 40 via line 54. Data packets received by IAD 60 from edge gateway 40 via line 54 are converted into data signals which IAD 60 provides to data equipment 64. Similarly, data signals received from data equipment 64 are converted into data packets which IAD 60 provides to edge gateway 40 via line 54. The function of IAD 60 to transmit and receive voice packets and data packets to and from edge gateway 40, and to facilitate the transmission of voice signals and data signals to and from voice equipment 62 and data equipment 64 is well known in the art. To facilitate communication with edge gateway 40 via line 54, IAD 60 includes a modem (not shown) along with other support circuitry (not shown) that facilitate the provisioning of voice and data services from edge gateway 40 to voice equipment 62 and data equipment 64.

Line 56 terminates at the premises of customer 52 in a DSL/T1 modem 66 which facilitates the provisioning of data services to data equipment 68 of customer 52. More specifically, modem 66 transmits and receives data packets to and from edge gateway 40, converts received data packets into data signals for use by data equipment 68 and converts data signals received from data equipment 68 into data packets, suitable for transmission to edge gateway 40.

Edge gateway 40 includes a modem 70 that facilitates communication with the modem of IAD 60 and modem 66. More specifically, edge gateway 40 is configured to facilitate the transmission of voice and data packets between packet switch 30 and customers 50 and/or 52 via modem 70 based upon a network address assigned to each customer 50 and 52. CO test head 36 includes a modem 72 that facilitates communication with modem 70 of edge gateway 40, the modem of IAD 60 or modem 66. Circuit switch 32 is configured to facilitate conventional voice communication between packet switch 30 and voice equipment 74 of customer 52 or voice equipment 76 of a customer 78 via plain old telephone service (POTS) lines 58 and 80, respectively.

A metallic line tester (MLT) or test controller 82 is coupled to packet switch 30 via a communication line 84. Preferably, communication line 84 is a digital interface. However, this is not to be construed as limiting the invention.

Connected to MLT 82 is a central database 88 which stores data about each customer connected to communication network 2. For each customer, this data can include a network address of the customer's modem on communication network 2, the Internet Protocol (IP) parameters of the customer's modem and the asynchronous transfer mode (ATM) parameters of the customer's modem. This data can be included in central database 88 by direct programming or by capturing this information from communication network 2. Regardless of how the data regarding each customer is included in central database 88, for the purpose of the present invention, it is only important that this data exists and is available to MLT 82 for reasons to be described hereinafter.

In the illustrated embodiment, MLT 82 is not included in CO 6. However, this is not to be construed as limiting the invention since MLT 82 can be included in CO 6.

RT 8 includes a multi-services edge gateway 90 which is coupled to packet switch 30 via high speed communication line 12. Connected to edge gateway 90 is a remote terminal (RT) test head 92. RT test head 92 is connected to edge gateway 90 via a test head communications line 94 and a test access line 96. Test head communication line 94 facilitates command and control communication between edge gateway 90 and RT test head 92. Test access line 96 enables test circuitry of RT test head 92 to connect to internal circuitry of edge gateway 90 or to customer circuits connected to edge gateway 90.

In the illustrated embodiment, customers 100 and 102 are connected to edge gateway 90. More specifically, customer 100 is connected to edge gateway 90 by a high speed communication line 104. Preferably, line 104 is a DSL or T1 line that is utilized to carry integrated voice and data packets between customer 100 and edge gateway 90. However, this is not to be construed as limiting the invention. Connected to an end of line i04 opposite edge gateway 90 is an Integrated Access Device (IAD) 106 that provisions voice and data services to and from voice equipment 108 and data equipment 110, respectively, of customer 100. The operation of IAD 106 is the same as the operation of IAD 60 described above.

Customer 102 is connected to edge gateway 90 via a high speed communication line 112. Preferably, communication line 112 is a DSL or T1 line that is utilized to carry data packets between customer 102 and edge gateway.90. However, this is not to be construed as limiting the invention. Connected to the end of communication line 112 opposite edge gateway 90 is a DSL/T1 modem 114 that provisions data services to and from data equipment 116 of customer 102. Modem 116 operates in the same manner as modem 66 described above.

Lastly, edge gateway 90 is connected to voice equipment 118 of customer 100 via a plain old telephone service (POTS) line 120, such as a conventional conductive telephone line. POTS line 120 facilitates analog communication between edge gateway 90 and voice equipment 118 of customer 100.

Edge gateway 90 includes a modem 122 that is configured to provision voice service to voice equipment 118 of customer 102 via POTS line 120. Modem 122 is also configured to provision data services to data equipment 116 of customer 102 via communication line 112. More specifically, modem 122 is configured to convert voice packets addressed to voice equipment 118 of customer 102 into voice signals which are provided to voice equipment 118. Similarly, voice signals received from voice equipment 118 are converted by modem 122 into voice packets which modem 122 provides to packet switch 30 via communication line 12. Data packets which are received by modem 122 from packet switch 30 and which are addressed to data equipment 116 are routed by modem 122 to modem 114 for conversion into data signals which are provided to data equipment 116. Similarly, data signals originating at data equipment 116 are converted by modem 114 into data packets which are transmitted to modem 122 which routes these data packets to packet switch 30 via communication line 12.

In edge gateways 40 and 90, modems 70 and 122 can be bypassed by CO test head 36 and RT test head 92, respectively, to facilitate direct testing of customer circuits thereby.

Having described the illustrated communication network 2, the isolation of faults or the source of degraded performance without dispatching service personnel will be described with reference to various examples. In a first example, suppose that customer 100 complains that his DSL service is not working. Under this circumstance, under the control of MLT 82 via packet switch 30, edge gateway 90 initially synchronizes modem 122 with the modem of IAD 106 of customer 100. Failure of this synchronization to occur indicates a problem with communication line 104, modem 122 or the modem of IAD 106. In order to further isolate the cause of the customer's complaint, MLT 82 establishes communication with RT test head 92 via packet switch 30 and edge gateway 90. Once this communication is established, MLT 82 causes metallic test circuitry (not shown) of RT test head 92 to connect directly to communication line 104 through edge gateway 90 bypassing modems 122 and 124. This connection between the metallic test circuitry of RT test head 92 and communication line 112 enables RT test head 92 to perform a well known prior art metallic test of communication line 104. If this metallic test fails, an indication of such is logged with MLT 82 and the test is terminated.

However, if the metallic test passes, an indication of such is logged with MLT 82. In response to this logging, MLT 82 causes RT test head 92 to acquire a metallic signature of the modem of IAD 106. This metallic signature can include, among other things, the input capacitance of the modem of IAD 106. If acquisition of the metallic signature of the modem of IAD 106 fails, an indication of such is logged with MLT 82 and the test is terminated.

Failure of the metallic test indicates that communication line 112 has either failed or is experiencing degraded performance. Failure of the metallic test will typically result in dispatch of service personnel to inspect communication line 104. Failure to acquire the metallic signature of the modem of IAD 106 indicates that the modem of IAD 106 is not connected to communication line 104. Failure of the metallic signature test, however, may result in a telephone call to customer 100 requesting that he confirm that the modem IAD 106 is plugged into communication line 112 and that IAD 106 is powered.

If RT test head 92 successfully acquires the metallic signature of the modem of IAD 106, an indication of such is logged with MLT 82. In response to receiving this indication, MLT 82 causes RT test head 92 to synchronize modem 124 with the modem of IAD 106 via edge gateway 90 by passing modem 122. The results of this synchronization are provided by RT test head 92 to MLT 82. If the synchronization is successful, it can by deduced that modem 122 is the cause of the customer's complaint. However, if the synchronization is not successful and the metallic signature of the modem of IAD 106 has been detected, it can be deduced that customer 100 has either removed power to IADs 106 or AD 106 has failed. In either event, an indication of the status of the synchronization is logged with MLT 82.

If the initial synchronization between modem 122 of edge gateway 90 and the modem of IAD 106 of customer 100 is successful, MLT 82 retrieves the IP and ATM parameters of the modem of IAD 106 from database 88 and transmits these parameters to RT test head 92 for installation in modem 124. Once these parameters are installed in modem 124, MLT 82 causes modem 124, emulating the IP and ATM parameters of the modem of IAD 106, to synchronize with modem 122 of edge gateway 90 at the same synchronization rate that modem 122 synchronized with the modem of IAD 60. If this synchronization fails, an indication of such is logged with MLT 82 and the test is terminated. From the logging of this indication, it can be deduced that modem 122 is not operating properly.

However, if this synchronization is successful, an indication of such is logged with MLT 82. In response to logging this indication, MLT 82 causes RT test head 92 to issue a command to perform a well known IP Ping test at a specified IP address. This specified IP address can be an IP address of file server 22, IP responder 24 of ISP 4 or switch/router 14. In either event, the IP address accompanying the IP Ping test command is routed by modems 124 and 122, edge gateway 90, and packet switch 30 to the data network comprised of ISP 4 and Internet 16. More specifically, the IP address accompanying the IP Ping test command is routed to switch/router 14 which either responds to the IP Ping test if the switch/router 14 has an IP address corresponding, to the IP address accompanying the IP Ping test command, or routes the IP Ping test command to file server 22 or IP responder 24 having an IP address corresponding to the IP address accompanying the IP Ping test command.

The IP Ping test is a well known prior art test for ensuring that a particular Internet address exists and can accept a request. The result of the IP Ping test is logged with MLT 82. If the IP Ping test passes, it can be deduced that the cause of the customer's complaint is data equipment 110 of customer 100. However, if the IP Ping test fails, it can be deduced that the data network is the cause of the customer's complaint.

In a second example, suppose that customer 100 complains that his DSL service is slow. Under this circumstance, MLT 82 retrieves from database 88 a network address of the modem of IAD 106 of customer 100 on communication network 2. Utilizing this network address, MLT 82 causes edge gateway 90 to synchronize its modem 122 with the modem of IAD 106 of customer 100. If synchronization is not successful, an indication of such is logged with MLT 82 and the test is terminated. However, if synchronization is successful, MLT 82 causes edge gateway 90 to utilize its modem 122 to determine an actual data transmission rate of the modem of IAD 106. Edge gateway 90 logs this actual data transmission rate with MLT 82. Next, MLT 82 causes RT test head 92 to connect its metallic test circuitry directly to line 104 via edge gateway 90 bypassing modems 122 and 124. Once connected, RT test head 92 utilizes its metallic test circuitry to perform a metallic test of line 104. More specifically, RT test head utilizes its metallic test circuitry to perform a well known single-ended insertion loss measurement and a well known wide band noise measurement of line 104. RT test head 92 logs the results of these tests with MLT 82 which determines therefrom a calculated data transmission rate of the modem of IAD 106 of customer 100. MLT 82 then compares this calculated data transmission rate with the actual data transmission rate previously logged with MLT 82. If the calculated and actual transmission rates are different by more than a predetermined amount or tolerance, under the control of MLT 82, edge gateway 90 adjusts the parameters of modem 122 so that the actual data transmission rate will be within the predetermined tolerance of the calculated data transmission rate. The parameters of modem 122 that can be adjusted include its output power and noise margin.

Next, under the control of MLT 882, RT test head 92 causes its modem 124 to synchronize with an IP address of the data network, i.e., ISP 4 and Internet 16, via modem 122 operating at the same synchronization rate that it synchronized with the modem of IAD 60. Prior to this synchronization, MLT 82 retrieves the IP and ATM parameters of the modem of IAD 106 of customer a 100 from database 82 and provides these parameters to RT test head 92 for installation in modem 124 whereupon, during synchronization with the IP address, modem 124 emulates the IP and ATM parameters of the modem of IAD 106. If synchronization fails, an indication of this is logged with MLT 82 and the test is terminated. However, if synchronization is successful, RT test head 92 determines the synchronization or data transfer rate and logs this synchronization rate with MLT 82. Thereafter, under the control of RT test head 92 via modem 124, Modem 122 of edge gateway 90 issues a file download command to the IP address of the data network. This file download command causes file server 22, IP responder, 24 or switch/router 14 to download a file of predetermined content to modem 124 of RT test head 92 via modem 122 of edge gateway 90. Based on this download, RT test head 92 determines an actual download data transmission rate of the downloaded file. This actual download data transmission rate is then logged with MLT 82 which compares the actual download data transmission rate to a predetermined download data transmission rate. If MLT 82 determines that the actual download data transmission rate is not within a predetermined tolerance of the predetermined download data transmission rate, it can be deduced that the data network is the cause of the customer's complaint regarding slow DSL service. However, if the actual download data transmission rate is within the predetermined tolerance of the predetermined download data transmission rate and if it was necessary to adjust the parameters of modem 122 of edge gateway 90 as previously described, it can be deduced that cause of the customer's complaint was sub-optimal setting of the parameters of modem 122. If both of these tests pass and if the customer's complaint persists, it may be necessary to dispatch service personnel to the premises of customer 100 to determine if the problem resides in data equipment 116 of customer 100.

In a third example, suppose that customer 100 complains that his voice connection is noisy. Under this circumstance, MLT 82 retrieves from database 88 the network address of customer 100 on communications network 2. Based on this network address, MLT 82 causes edge gateway 90 to synchronize its modem 122 with the modem of IAD 106 of customer 100. If synchronization fails, an indication of such is logged with MLT 82 and the test is terminated. However, if the synchronization is successful, modem 122 determines an actual data transmission rate of the modem of IAD 106 and an actual cell error rate of a data transmission between the modem of IAD 106 and modem 122. Edge gateway 90 then logs the actual data transmission rate and the actual cell error rate with MLT 82.

Next, under the control of MLT 82, RT test head 92 connects its metallic test circuitry directly to line 104 via edge gateway 90 bypassing modems 122 and 124. Once this connection is established, RT test head 92 performs a metallic test of line 104. This metallic test includes a single-ended insertion loss measurement and a wide band noise measurement. Under the control of MLT 82, RT test head 92 will also look for metallic faults on line 104. RT test head 92 logs the results of the tests with MLT 82 which determines therefrom an estimated data transmission rate of the modem of IAD 106. MLT 82 then compares the actual and estimated data transmission rates of the modem of IAD 106. If the estimated data transmission rate is different by more than a predetermined tolerance from the actual data transmission rate, an indication of such is logged with MLT 82 and the test is terminated. Similarly, if the actual cell error rate is different by more than a predetermined tolerance from a predetermined cell error rate, MLT 82 logs an indication of such and terminates the test.

However, if the estimated data transmission rate is within the predetermined tolerance of the actual data transmission rate and if the actual cell error rate is within the predetermined tolerance of the predetermined cell error rate, the IP and ATM parameters of the modem of IAD 106 are retrieved from database 88 by MLT 82 and supplied to RT test head 92 for installation in modem 124. Once the IP and ATM parameters of customer 100 are installed in modem 124, under the control of MLT 82, RT test head 92 causes modem 124 to synchronize with modem 122 operating at the same synchronization rate that it synchronized with the modem of IAD 60. If this synchronization fails, an indication of such is logged with MLT 82 and the test is terminated. However, if the synchronization is successful, under the control of MLT 82, RT test head 92 initiates a voice quality test of the voice network of communication network 2 via modem 124 and modem 122. This voice network includes line 34 and circuit switch 32.

This voice quality test includes RT test head 92 transmitting a voice packet to packet switch 30 via modems 124 and 122. Packet switch 30 converts this voice packet into a digital voice signal which is routed through circuit switch 32 to CO test head 36 via line 38. CO test head 36 analyzes the quality of this voice signal and logs an indication of such with MLT 82. If the quality of this voice signal is not acceptable, it can be deduced that the cause of the customer's complaint that the voice connection is noisy resides in s gateway 90, line 12, packet switch 30 and/or circuit switch 32.

However, if the quality of the voice signal is acceptable, under the control of MLT 82, RT test head 92 causes modem 124 to synchronize with modem 122 of edge gateway 90 at a data rate that is slower than the synchronization rate utilized to perform the above described voice quality test. If this synchronization is not successful, an indication of such is logged with MLT 82 and the test is terminated. However, if this synchronization is successful, under the control of MLT 82, RT test head 92 causes modem 124 to issue a file download command to an IP address of the data network via modem 122 of edge gateway 90. As described above in connection with example 2, the IP address can be that of file server 22, IP responder 24 or switch/router 14. Regardless, in response to receiving the file download command, file server 22, IP responder 24 or switch/router 14 downloads a predetermined file to modem 124 via modem 122.

During download of this file, under the control of MLT 82, RT test head 92 causes modem 124 to initiate another voice quality test of the voice network via modem 122 of edge gateway 90. This other voice quality test includes RT test head 92 transmitting a data packet to packet switch 30 via modems 122 and 124. Packet switch 30 converts this other voice packet into another digital voice signal which is routed through circuit switch 32 to CO test head 36 via line 38. CO test head 36 analyzes the quality of this other voice signal and logs an indication of such with MLT 82. If the quality of this other voice signal is not acceptable, it can be deduced that the cause of the customer's complaint that the voice connection is noisy resides in edge gateway 90, line 12, packet switch 30 and/or circuit switch 32. However, if the quality of the other voice signal is acceptable, the cause of the customer's complaint that the voice connection is noisy has not been identified and the dispatch of service personnel is required.

As can be seen, the present invention provides various tests that can be run on communication network 2 to isolate the cause of a fault or degraded service without the need to dispatch service personnel. While described in connection with running tests related to customer 100, it should be appreciated that appropriate ones of the foregoing tests can be conducted on one or both of lines 112 and 120 of customer 102 as required. For example, metallic tests of lines 112 and 120 can be conducted and the metallic signatures of data equipment 116 and voice equipment 118 can be acquired. In addition, tests can be selectively performed for determining the efficacy of modem 114 to process data packets into data signals and vice versa, for determining the efficacy of voice equipment 118 to process voice signals and for determining the efficacy of modem 122 to convert voice packets it voice signals and vice versa. Moreover, under the control of MLT 82, the above described tests conducted in connection with customer 100 for isolating faults or degraded service between modem 122 and the voice and data networks can also be conducted in connection with customer 102.

Sill further, appropriate ones of the foregoing tests can be conducted on lines 54, 56, 58 and 80, the modem of IAD 60, modern 66 and voice equipment 62, 74 and 76 of customers 50, 52 and 78 as well as modem 70 of edge gateway 40 under the control of MLT 82 via central office test head 36. To this end, the tests described above in connection with edge gateway 90 and RT test head 92 for customers 100 and 102 can be performed under the control of MLT 82 by edge gateway 40 and CO test head 36 for customers 50, 52 and 78.

The invention has been described with reference to the preferred embodiments. Obvious modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A method of fault isolation on a communication network having a metallic line tester (MLT) and an Internet Service Provider (ISP) communicatively coupled to an edge gateway that provisions voice and/or data services to a customer via a conductive line, the method comprising the steps of:
   (a) causing the MLT to retrieve from a database a network address of a modem of the customer on the communication network, the internet protocol (IP) parameters of the customer's modem and the asynchronous transfer mode (ATM) parameters of the customer's modem;
   (b) synchronizing a modem of the edge gateway with the customer's modem at the network address;
   (c) installing the IP and ATM parameters in a modem of a test head that is coupled to the edge gateway;
   (d) synchronizing the test head modem with the edge gateway modem operating at the same synchronization rate that it synchronized with the customer's modem in step (b);
   (e) following synchronization in step (d) causing the edge gateway modem to issue a Ping test command to an IP address of a data network of the ISP;
   (f) receiving the result of the Ping test at the test head modem; and
   (g) logging the result of the Ping test with the MLT.

2. The method as set forth in claim 1, further including the steps of:
   if synchronization in step (b) is not achieved, causing the test head to perform a metallic test of the conductive line via the edge gateway bypassing its modem;
   if the metallic test passes, causing the test head to acquire a metallic signature of the customer modem via the edge gateway bypassing its modem; and
   if the metallic signature is acquired, synchronizing the test head modem with the customer modem whereupon, if synchronization is successful, logging an indication of such with the MLT, wherein said logging indicates the edge gateway modem is not operating properly.

3. The method as set forth in claim 2, further including the steps of:
   if the metallic test fails, logging an indication of such with the MLT and terminating the method, wherein said logging indicates the conductive line is not operating properly;
   if the metallic signature is not acquired, logging an indication of such with the MLT and terminating the method, wherein said logging indicates that the customer modem is not connected; and
   if the metallic signature is acquired and if synchronization between the test head modem and the customer modem is not successful, logging an indication of such with the MLT, wherein said logging indicates that the customer modem is not powered or has failed.

4. The method as set forth in claim 1, further including the step of:
   if synchronization in step (d) is not achieved, logging an indication of such with the MLT and terminating the method, wherein said logging indicates that the edge gateway modem is not operating properly.

5. The method as set forth in claim 1, further including the step of:
   if the Ping test fails, logging an indication of such with the MLT and terminating the method, wherein said logging indicates that the data network is not operating properly.

6. A method of fault isolation on a communication network having a metallic line tester (MLT) and an Internet Service Provider (ISP) communicatively coupled to an edge gateway that provisions voice and/or data services to a customer via a conductive line, the method comprising the steps of:
   (a) causing the MLT to retrieve from a database a network address of a modem of the customer on the communication network, the internet protocol (IP) parameters of the customer modem and the asynchronous transfer mode (ATM) parameters of the customer modem;
   (b) synchronizing a modem of the edge gateway with the customer modem at the network address;
   (c) following synchronization in step (b), causing the edge gateway modem to determine an actual data transmission rate of the customer modem;
   (d) causing a mode of a test head coupled to the edge gateway to perform a metallic test of the conductive line via the edge gateway bypassing its modem;
   (e) determining from the metallic test a calculated data transmission rate of the customer modem;
   (f) comparing the calculated and actual data transmission rates;
   (g) if the calculated and actual data transmission rates are different by more than a predetermined tolerance, adjusting parameters of the edge gateway modem so that the actual data transmission rate is within the predetermined tolerance of the calculated data transmission rate;
   (h) installing the IP and ATM, parameters of the customer modem in the test head modem;
   (i) synchronizing the test head modem with the edge gateway modem at the same synchronization rate that it synchronized with the customer modem in step (b);
   (j) synchronizing the edge gateway modem with an IP address of a data network of the ISP;
   (k) following synchronization in step (j), logging an indication of the synchronization rate with the MLT;
   (l) causing the edge gateway modem to issue a file download command to an IP address of the data network;
   (m) in response to the file download command, downloading a predetermined file to the edge gateway from the data network;

(n) determining an actual download data transmission rate of the downloaded file; and (o) comparing the actual download data transmission rate to a predetermined download data transmission rate.

7. The method as set forth in claim 6, further including the step of:

if the difference between the actual download data transmission rate and the predetermined data transmission rate is greater than a predetermined tolerance, logging an indication of such with the MLT, wherein said logging indicates that the data network is not operating properly.

8. The method as set forth in claim 6, further including the steps of:

if synchronization in step (b) is not achieved, logging an indication of such with the MLT and terminating the method, wherein said logging indicates that the edge gateway modem or the customer modem is not operating properly; and if synchronization in step (j) is not achieved, logging an indication of such with the MLT and terminating the method, wherein said logging indicates that the data network is not operating properly.

9. A method of fault isolation on a communication network having a controller, a data network and a voice network communicatively coupled to a packet switch that facilitates communication with an edge gateway that provisions voice and/or data services to a customer, the method comprising the steps of:

(a) causing the controller to retrieve from a database modem parameters of a modem of the customer;

(b) synchronizing the customer's modem with a modem of the edge gateway;

(c) following synchronization in step (b), determining an actual data transmission rate of the customer modem and an actual cell error rate of a data transmission by the customer modem;

(d) causing a test head coupled to the edge gateway to perform a test of a conductive line connected to the customer modem via the edge gateway bypassing its modem;

(e) determining from the test in step (d) an estimated data transmission rate of the customer modem;

(f) comparing the actual and estimated data transmission rates of the customer modem;

(g) configuring the test head modem with the customer modem parameters;

(h) synchronizing the test head modem with the edge gateway modem at the same synchronization rate that it synchronized with the customer's modem in step (b);

(i) initiating a voice quality test of the voice network from the edge gateway under the control of the test head via the test head modem and the edge gateway modem;

(j) synchronizing the test head modem with the edge gateway modem at a data rate that is slower than the synchronization in step (h);

(k) causing the edge gateway modem to issue a file download command to an IP address of the data network;

(l) in response to the file download command, downloading a predetermined file from the data network to the edge gateway modem; and (m) during download of the file in step (l), initiating a voice quality test of the voice network from the edge gateway under the control of the test head via the test head modem and the edge gateway modem.

10. The method as set forth in claim 9, further including the step of:

if synchronization in step (b) is not achieved, logging an indication of such with the controller and terminating the method, wherein said logging indicates that the edges gateway modem or the customer modem is not operating properly.

11. The method as set forth in claim 9, further including the steps of:

if the actual cell error rate determined in step (c) is different by more than a predetermined tolerance from a predetermined cell error rate, logging an indication of such with the controller and terminating the method, wherein said logging indicates that the edge gateway modem or the customer modem is not operating properly; and if the comparison in step (f) indicates that the estimated data transmission rate is different by more than a predetermined tolerance from the actual data transmission rate, logging an indication of such with the controller and terminating the method, wherein said logging indicates that the edge gateway modem or the customer modem is not operating property.

12. The method as set forth in claim 9, further including the steps of:

if the synchronization in step (h) is not achieved, logging an indication of such with the controller and terminating the method, wherein said logging indicates that the edge gateway modem is not operating properly; and if the synchronization in step (j) is not achieved, logging an indication of such with the controller and terminating the method, wherein said logging indicates that the edge gateway modem is not operating properly.

13. The method as set forth in claim 9, further including the step of:

if one of the voice quality test in step (i) fails and the voice quality test in step (m) fails, logging an indication of such with the controller, wherein said logging indicates that the edge gateway, the voice network or the packet switch is not operating properly.

14. A method of fault isolation on a communication network having a controller, a data network, a voice network and an integrated data/voice network communicatively coupled to a packet switch, with the integrated data/voice network including an edge gateway coupled to the packet switch, a test head coupled to the edge gateway, and a customer modem coupled to the edge gateway via a conductive line, with the customer modem residing at a network address of the integrated data/voice network, the method comprising the steps of:

(a) causing the controller to retrieve from a database the network address and modem parameters of the customer modem;

(b) acquiring synchronization between a modem of the edge gateway and the customer modem via the conductive line;

(c) if synchronization in step (b) is not acquired, logging an indication of such with the controller and terminating the method;

(d) testing the efficacy of the conductive line between the edge gateway modem and the customer modem with the test head;

(e) if the test in step (d) indicates that the efficacy of the conductive line is not within a predetermined tolerance, logging an indication of such with the controller and terminating the method;

(f) installing the customer's modem parameters in a modem of the test head;

(g) acquiring synchronization between the test head modem and the edge gateway modem at the same synchronization rate as that it acquired synchronization with the customer modem in step (b);

(h) if synchronization in step (g) is not acquired, logging an indication of such with the controller and terminating the method;

(i) initiating a test of at least one of the data network and the voice network from the edge gateway under the control of the test head via the test head modem and the edge gateway modem;

(j) receiving the result of the test initiated in step (i); and (k) if the result of the test received in step (j) is not acceptable logging an indication of such with the controller and terminating the method.

15. The method as set forth in claim 14, wherein, in step (i):

the test of the data network includes at least one of a Ping test and determining a data transmission rate of a file download from the data network to the edge gateway modem; and the test of the voice network includes initiating a first voice quality test of the voice network with the edge gateway modem operating at a first data rate.

16. The method as set forth in claim 15, wherein the test of the voice network in step (i) further includes initiating a second voice quality test of the voice network with the edge gateway modem operating at a second, slower data rate concurrent with the download of a file to the edge gateway modem from the data network.

* * * * *

UNITED STATES PATENT AND TRADEMARK OFFICE
CERTIFICATE OF CORRECTION

| | | |
|---|---|---|
| PATENT NO. | : 7,433,323 B2 | Page 1 of 1 |
| APPLICATION NO. | : 10/479431 | |
| DATED | : October 7, 2008 | |
| INVENTOR(S) | : Smith | |

It is certified that error appears in the above-identified patent and that said Letters Patent is hereby corrected as shown below:

<u>Title Page</u>, Insert the following domestic priority information:

Item -- (60)    Related U.S. Application Data
Provisional application No. 60/295,035, filed on June 1, 2001. --

<u>Title Page</u>, Item (86) PCT § 371(c)(1), (2), (4) Date:
"Apr. 30, 2004" should read -- Apr. 29, 2004 --

<u>Column 10</u>, Line 42 of Claim 6, "causing a mode" should read -- causing a modem --

<u>Column 12</u>, Line 22, Claim 11, "not operating property" should read -- not operating properly --

Signed and Sealed this

Twenty-fourth Day of February, 2009

JOHN DOLL
*Acting Director of the United States Patent and Trademark Office*